US008279480B2

(12) United States Patent
Watanabe

(10) Patent No.: US 8,279,480 B2
(45) Date of Patent: Oct. 2, 2012

(54) IMAGE FORMING APPARATUS AND METHOD OF CONTROLLING THE SAME

(75) Inventor: Akinori Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/699,311

(22) Filed: Feb. 3, 2010

(65) Prior Publication Data

US 2010/0220353 A1 Sep. 2, 2010

(30) Foreign Application Priority Data

Feb. 27, 2009 (JP) .................................. 2009-047017

(51) Int. Cl.
*G06F 3/12* (2006.01)

(52) U.S. Cl. ..................... 358/1.15; 358/1.16; 358/1.13; 358/1.14; 358/1.18; 358/1.9; 399/50; 399/18

(58) Field of Classification Search .................. 358/1.15
See application file for complete search history.

(56) References Cited

U.S. PATENT DOCUMENTS

| 5,321,486 | A  | * | 6/1994  | Nanbu et al.      | 399/14  |
|-----------|----|---|---------|-------------------|---------|
| 5,664,222 | A  |   | 9/1997  | Inakoshi          | 710/16  |
| 6,816,282 | B2 | * | 11/2004 | Tachibana et al.  | 358/1.4 |
| 6,898,385 | B2 | * | 5/2005  | Ito et al.        | 399/50  |
| 2001/0019417 | A1 | * | 9/2001 | Ueki           | 358/1.9 |
| 2006/0126092 | A1 | * | 6/2006 | Okanishi et al. | 358/1.13 |
| 2008/0304118 | A1 | * | 12/2008 | Ohmiya         | 358/498 |

FOREIGN PATENT DOCUMENTS

JP 5-210470 8/1994

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

This invention provides an image forming apparatus for accurately specifying the type of the apparatus without increasing cost, and a method of controlling the same. To accomplish this, an image forming apparatus of the embodiment executes a continuous image formation test to specify the model of the self apparatus when a system control unit is connected to an engine control unit. In the continuous image formation, the image forming apparatus measures the period from synchronization signal output by the engine control unit to output of the next print start request by the system control unit, and specifies the model of the self apparatus in accordance with the measured period.

8 Claims, 7 Drawing Sheets

IMAGE FORMING APPARATUS AND METHOD OF CONTROLLING THE SAME

BACKGROUND OF THE INVENTION

1. Field of the Invention

The present invention relates to an image forming apparatus for specifying the type of the apparatus and a method of controlling the same.

2. Description of the Related Art

The recently increasing variety of office styles is producing demands for an image forming apparatus capable of coping with various office environments. Under these circumstances, not only an MFP (Multi Function Printer) having scanner and facsimile functions but also a single-function printer that mainly features a printing function is becoming rich in variety. However, developing individual models increases the development costs. It is therefore necessary to meet user needs while adapting common basic arrangements.

For example, printers include an apparatus having only a USB (Universal Serial Bus) I/F serving as an external interface to be connected to a host computer or the like, and an apparatus having a network I/F in addition to a USB I/F. There are also printers that do not support an optional paper feed cassette, a printer whose product line is broadened by changing the number of supported optional paper feed cassettes, and a printer capable of attaching a double-sided unit.

To simply design and produce the units of combinations assumed for the plurality of products as described above, selector terminals made of DIP switches or the like are necessary, and efficiency is reduced. To solve this problem, a method has been proposed which achieves commonality of units as much as possible and performs concentrated management while confirming the software ID or selector terminal state of one unit. For example, Japanese Patent Laid-Open No. 05-210470 proposes a printer which eliminates use of selector terminals and instead specifies a model based on a signal from a detector provided in a printer mechanism unit.

However, this prior art has the following problems. For example, in the method of specifying a model using a selector terminal or a method of specifying a model based on predetermined information stored in a nonvolatile memory, external stress such as noise may change the signal level of the selector terminal or the stored information.

In this case, if the product displays an error message and interrupts the operation, no problem is posed because the user can confirm the occurrence of error and work out a countermeasure. However, since the product purchased by the user sometimes performs operations different from its specifications without detecting any error, an option to be supported originally may not be able to operate, or an unexpected operation may accelerate degradation of components.

The technique described in Japanese Patent Laid-Open No. 05-210470 is an effective solution if a printing element such as a dot printer is driven, and the home position or relative position can accurately be detected mechanically. However, the technique is not applicable to an apparatus that drives no printing element. Additionally, a mechanism for independently generating pulses and a mechanism for detecting the number of pulses are necessary for specifying the model, resulting in an increase in cost.

SUMMARY OF THE INVENTION

The present invention enables realization of an image forming apparatus for accurately specifying the type of the apparatus without increasing cost, and a method of controlling the same.

One aspect of the present invention provides an image forming apparatus comprising a first control unit that controls the image forming apparatus, and a second control unit that controls image formation processing, said first control unit comprising: a start request output unit that outputs a start request to start image formation to said second control unit; and a data output unit that outputs image data for image formation to said second control unit in accordance with a synchronization signal output from said second control unit, and said second control unit comprising: a synchronization signal output unit that generates the synchronization signal and outputs the synchronization signal to said first control unit in response to the start request from said first control unit; an execution unit that executes image formation based on the image data output from said first control unit in accordance with the synchronization signal; a measuring unit that measures a period from output of the synchronization signal to reception of a next start request output from said first control unit; and a model specifying unit that specifies a model of the image forming apparatus in accordance with the period measured by said measuring unit.

Another aspect of the present invention provides a method of controlling an image forming apparatus comprising a first control unit that controls the image forming apparatus, and a second control unit that controls image formation processing, comprising: causing the first control unit to output a start request to start image formation to the second control unit; causing the second control unit to generate a synchronization signal and output the synchronization signal to the first control unit in response to the start request from the first control unit; causing the first control unit to output image data for image formation to the second control unit in accordance with the synchronization signal output from the second control unit; causing the second control unit to execute image formation based on the image data output from the first control unit in accordance with the synchronization signal; causing the second control unit to measure a period from output of the synchronization signal to reception of a next start request output from the first control unit; and causing the second control unit to specify a model of the image forming apparatus in accordance with the period measured in the step of causing the second control unit to measure.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

The embodiment of the present invention will now be described with reference to FIGS. 1 to 7. First, the arrangement of a laser printer that is an image forming apparatus will be explained with reference to FIG. 1. Note that the image forming apparatus to which the present invention is applied need not always be a laser printer and can be an image forming apparatus of any other printing scheme.

A printer 1500 indicates the laser printer main body. The printer 1500 receives print information (e.g., character codes), form information, or macro instructions from an externally connected host computer. Upon receiving such information, the printer 1500 stores the input information in a memory, creates a corresponding character pattern or form pattern in accordance with the input information, and forms an image on a printing paper sheet serving as a printing material.

Figure 1:
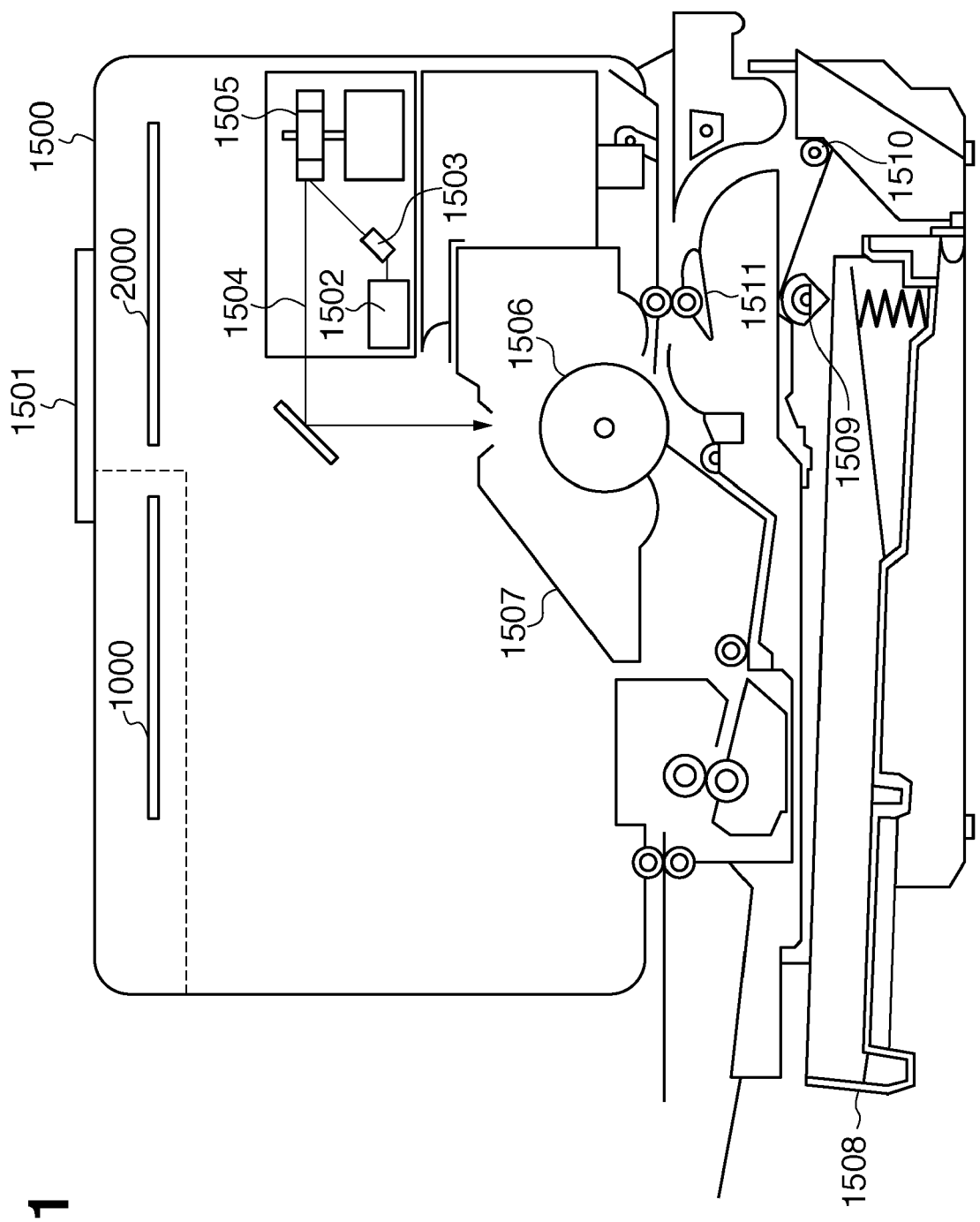
FIG. 1 is a sectional view showing an example of the arrangement of a printer 1500 according to the embodiment.

An operation unit 1501 shown in FIG. 1 includes switches and LED indicators serving as a user interface. A system control unit 1000 functioning as a first control unit analyzes print information supplied from, for example, a host computer connected via a network and performs image processing for the information. An engine control unit 2000 functioning as a second control unit controls a printing unit (printer engine).

The engine control unit 2000 is connected to the system control unit 1000 to comprehensively control image formation processing. For example, the engine control unit 2000 controls motors and sensors and executes image formation processing. Note that the system control unit 1000 is configured to be interchangeable at unit level. That is, a system control unit corresponding to each product is attached.

The system control unit 1000 controls the entire system of the printer 1500. More specifically, the system control unit 1000 has a video controller function. The system control unit 1000 converts input information into a video signal of a character pattern corresponding to character information and outputs it to a laser driver 1502. The converted video signal is synchronized with the engine control unit 2000. The laser driver 1502 is a circuit for driving a semiconductor laser 1503. The laser driver 1502 turns on/off a laser beam 1504 emitted from the semiconductor laser 1503 in accordance with the input video signal.

As shown in FIG. 1, the laser beam 1504 is deflected to the left and right by a polygon mirror 1505 so as to scan and expose the surface of an electrostatic drum 1506. With this operation, an electrostatic latent image is formed on the electrostatic drum 1506. The electrostatic latent image is developed by a development unit 1507 arranged near the electrostatic drum 1506 and then transferred to a printing material. A printing material on which an image is to be formed is stored in a paper cassette 1508. When image formation starts, a paper sheet stored in the paper cassette is fed into the apparatus by a feed roller 1509 and conveyance rollers 1510 and 1511 and supplied to the electrostatic drum 1506.

The printer 1500 has at least one card slot. An optional font card in addition to internal fonts, a control card (emulation card) of a different language system, or an extended paper feed cassette is connected to the card slot.

<Control Arrangement of Image Forming Apparatus>

The control arrangement of the printer 1500 will be described next with reference to FIG. 2. Note that the system may be either a system including a single device or a plurality of devices or a system for performing processing via a network such as a LAN if it can execute the functions to be explained below.

Figure 2:
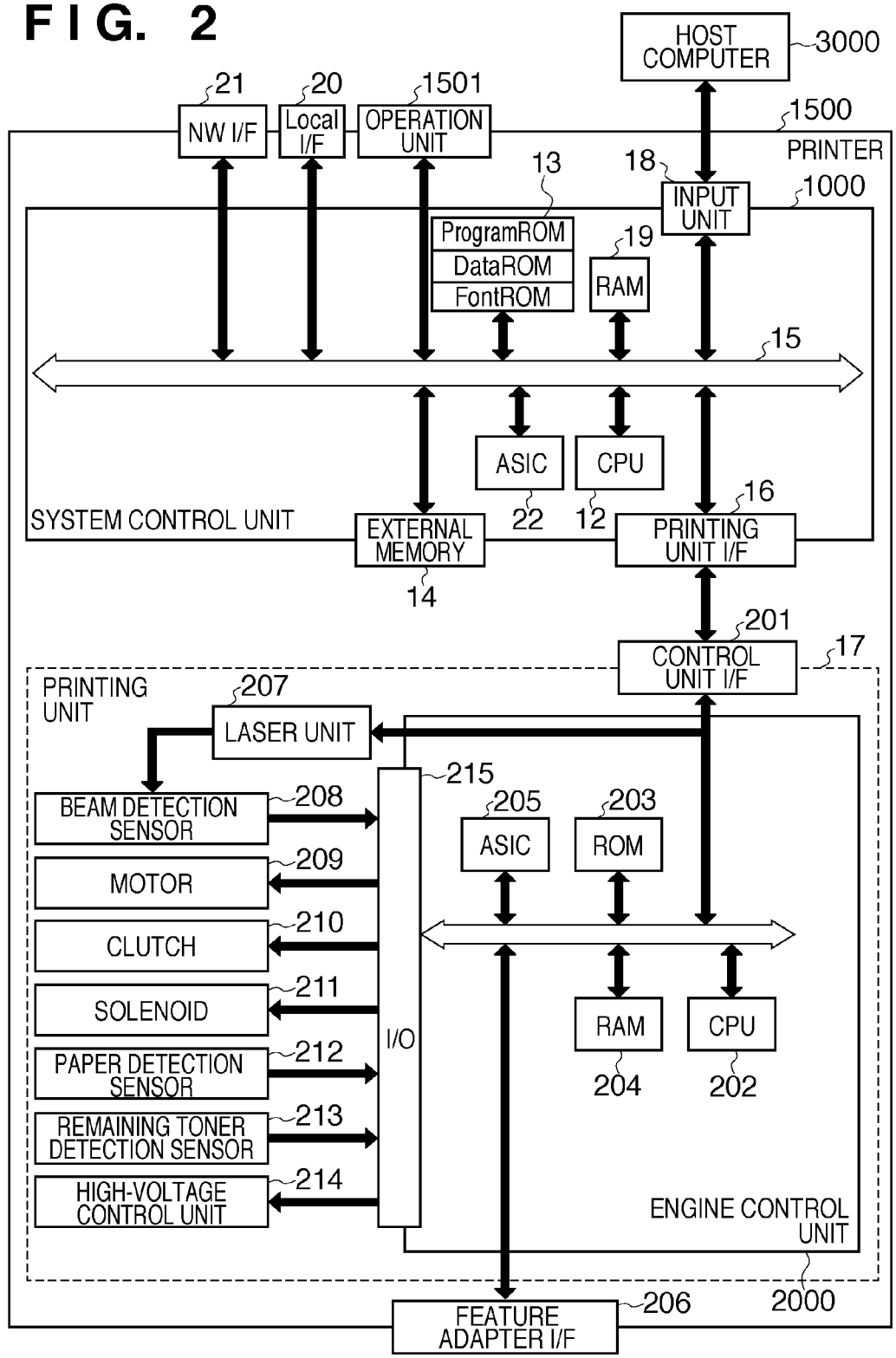
FIG. 2 is a block diagram showing the control arrangement of the printer 1500 according to the embodiment.

As shown in FIG. 2, the system control unit 1000 includes a CPU 12, ROM 13, external memory 14, printing unit I/F 16, input unit 18, RAM 19, and ASIC 22. These control blocks are connected via a system bus 15 so as to be mutually communicable. The CPU 12 reads out control programs stored in the program ROM of the ROM 13 or control programs stored in the external memory 14 and executes the programs. The CPU 12 thus comprehensively controls access to the control blocks connected to the system bus 15, and outputs an image signal, that is, output information to a printing unit (printer engine) 17 connected via the printing unit I/F 16.

The font ROM of the ROM 13 stores font data and the like to be used to generate the output information. The data ROM of the ROM 13 stores information and the like to be used on the host computer in behalf of the external memory 14 such as a hard disk.

The input unit 18 controls communication with a host computer 3000 and receives code data or image data described in a language unique to the printer. Hence, the CPU 12 is connected to the host computer via the input unit 18 so as to be communicable. This allows the CPU 12 to receive information from the host computer or transmit information in the printer to the host computer.

The RAM 19 functions as, for example, the main memory and work area of the CPU 12. For example, the RAM 19 is used as an output information bitmapping area, environment data storage area, NVRAM, or the like. The memory capacity can be expanded by an optional RAM connected to an expansion port.

The ASIC 22 includes control circuits such as the memory controller of the ROM 13 and RAM 19, a DMA controller, and an I/F controller. The ASIC 22 also sequentially analyzes text information or the like from the host computer, which is stored in the RAM 19, rasterizes, for example, character codes into bitmap data using data in the font ROM, and stores the bitmap data in the RAM (bitmap memory). Image data rasterized for each band or each page by the ASIC 22 is output to the printing unit 17 via the printing unit I/F 16.

The external memory 14 is a hard disk (HD) or an IC card, and access to it is controlled by the ASIC 22. The external memory 14 is optionally connected to store font data, emulation programs, form data, and the like.

A plurality of external memories 14 may be connected to the system control unit 1000 to store optional font cards in addition to internal fonts and programs to interpret printer control languages of different systems. The system control unit 1000 may also include an NVRAM to store printer mode setting information from the operation unit 1501. The operation unit 1501 is a user interface including switches and LED indicators.

A power supply unit incorporated in the printing unit 17 supplies power to the system control unit 1000. Power supply control is done via the printing unit I/F 16.

As shown in FIG. 2, the engine control unit 2000 is included in the printing unit 17 to control image formation processing. The engine control unit 2000 includes a CPU 202, ROM 203, RAM 204, and ASIC 205. The CPU 202 sequentially reads out control programs from the ROM 203 and executes them to comprehensively control the printing unit 17. The RAM 204 is a main storage unit used as an input data storage area, a storage area for work, or the like.

An I/O port 215 connects the engine control unit 2000 to various kinds of engines. More specifically, engines such as a motor 209 that drives the paper feed system, conveyance system, or optical system, a clutch 210, a solenoid 211, a paper detection sensor 212 configured to detect a conveyed paper sheet, a remaining toner detection sensor 213, a high-voltage control unit 214, and a beam detection sensor 208 are connected to the I/O port 215. The beam detection sensor 208 is connected to a laser unit 207. The remaining toner detection sensor 213 detects the toner amount of the development unit 1507, and inputs the output signal to the I/O port 215. The high-voltage control unit 214 outputs a high voltage to the development unit 1507 in accordance with an instruction from the CPU 202.

The system control unit 1000 executes various kinds of image processing for image data, and outputs the control signal of the laser unit 207 based on the image data. A laser beam output from the laser unit 207 irradiates the electrostatic drum 1506. The beam detection sensor 208 arranged in the non-image area detects the light emission state of the laser beam. The beam detection sensor 208 receives the laser beam emitted by the laser unit 207, and inputs an output signal corresponding to the received laser beam to the I/O port 215. An optional paper feed cassette or a double-sided unit can be attached to the printer 1500. These optional units are connected to the engine control unit 2000 via a feature adapter I/F 206. Like the system control unit 1000, the engine control unit 2000 may include an NVRAM to store setting information.

<Operation Sequences>

The operation sequences of the system control unit 1000 and the engine control unit 2000 will be described next with reference to FIGS. 3 to 7. The operation sequence in an assembly process will be described first with reference to FIG. 3. Note that the operation sequence when the system control unit 1000 is assembled to the printer 1500 in the assembly process at a factory will be described here. That is, operation check processing to be executed when the engine control unit 2000 and the system control unit 1000 are connected for the first time will be explained.

When the system control unit 1000 is connected to the engine control unit 2000, the engine control unit 2000 first supplies power to the system control unit 1000 to do operation check. After that, the system control unit 1000 confirms the model (type) of the self apparatus. On the other hand, the engine control unit 2000 confirms the state of a self-determined flag. The self-determined flag represents whether the model of the self apparatus has been specified. The self-determined flag becomes settable at a timing the system control unit 1000 is connected to the engine control unit 2000 for the first time in the product assembly process. The self-determined flag is initially in an unset state and exhibits, for example, a value "0". When the model of the self apparatus is specified, the self-determined flag changes to a set state and exhibits, for example, a value "1".

Then, a continuous printing test is executed. When the continuous printing test is executed, the system control unit 1000 transmits a print start request to the engine control unit 2000. Upon receiving the print start request, the engine control unit 2000 outputs a synchronization signal and receives video data. These processes are repeated until data of all continuous printing pages are received. In this case, synchronization signal output control in the engine control unit 2000 corresponds to the initial setting mode so that the control is performed for a predetermined model.

The engine control unit 2000 also measures the timing between the synchronization signal and the print start request, and specifies the model based on the result. In addition, the engine control unit 2000 sets the above-described self-determined flag to prevent repetitious model specifying in the next activation.

Figure 3:
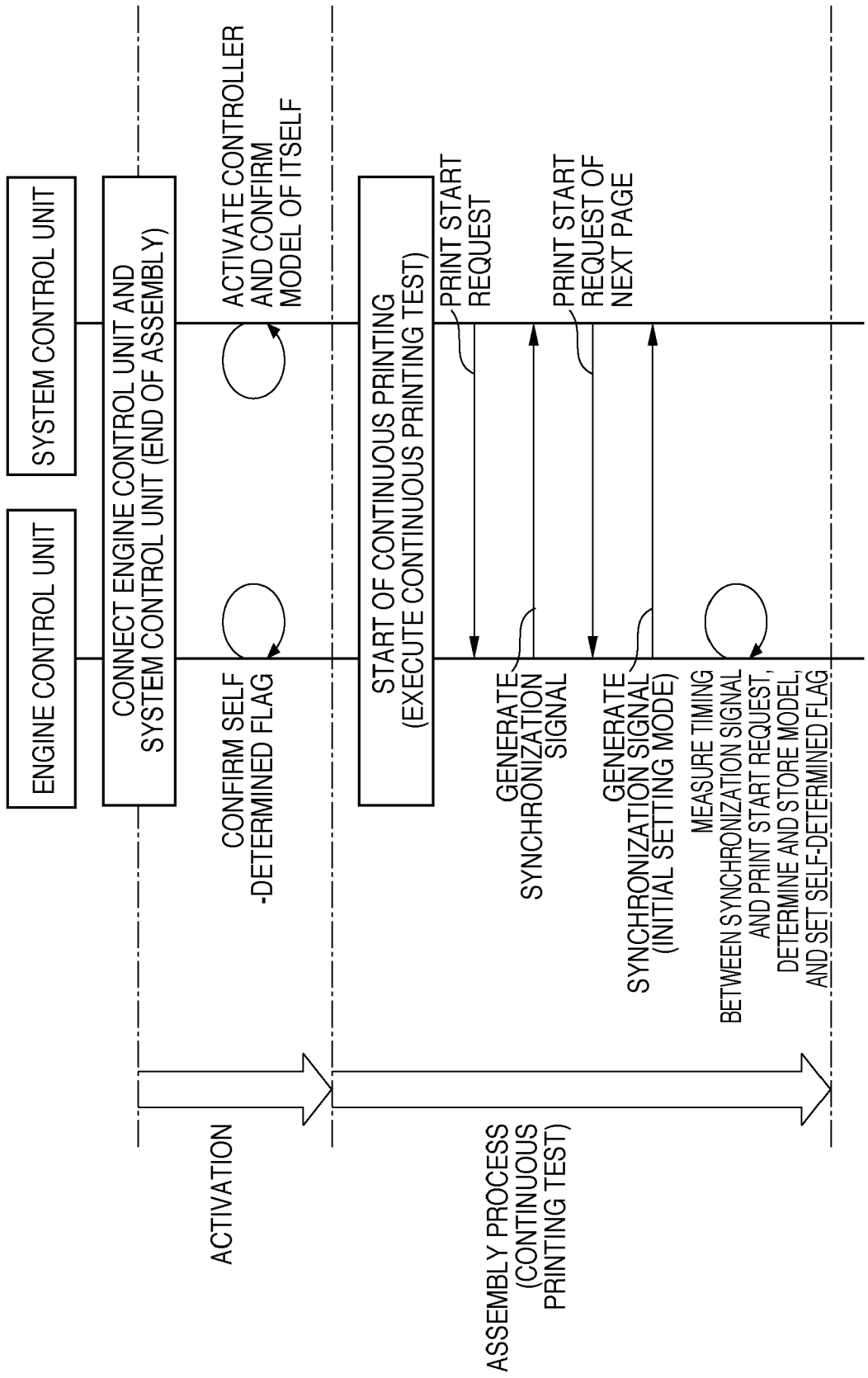
FIG. 3 is a sequence chart showing the operation sequence of continuous printing in an assembly process according to the embodiment.
Figure 5:
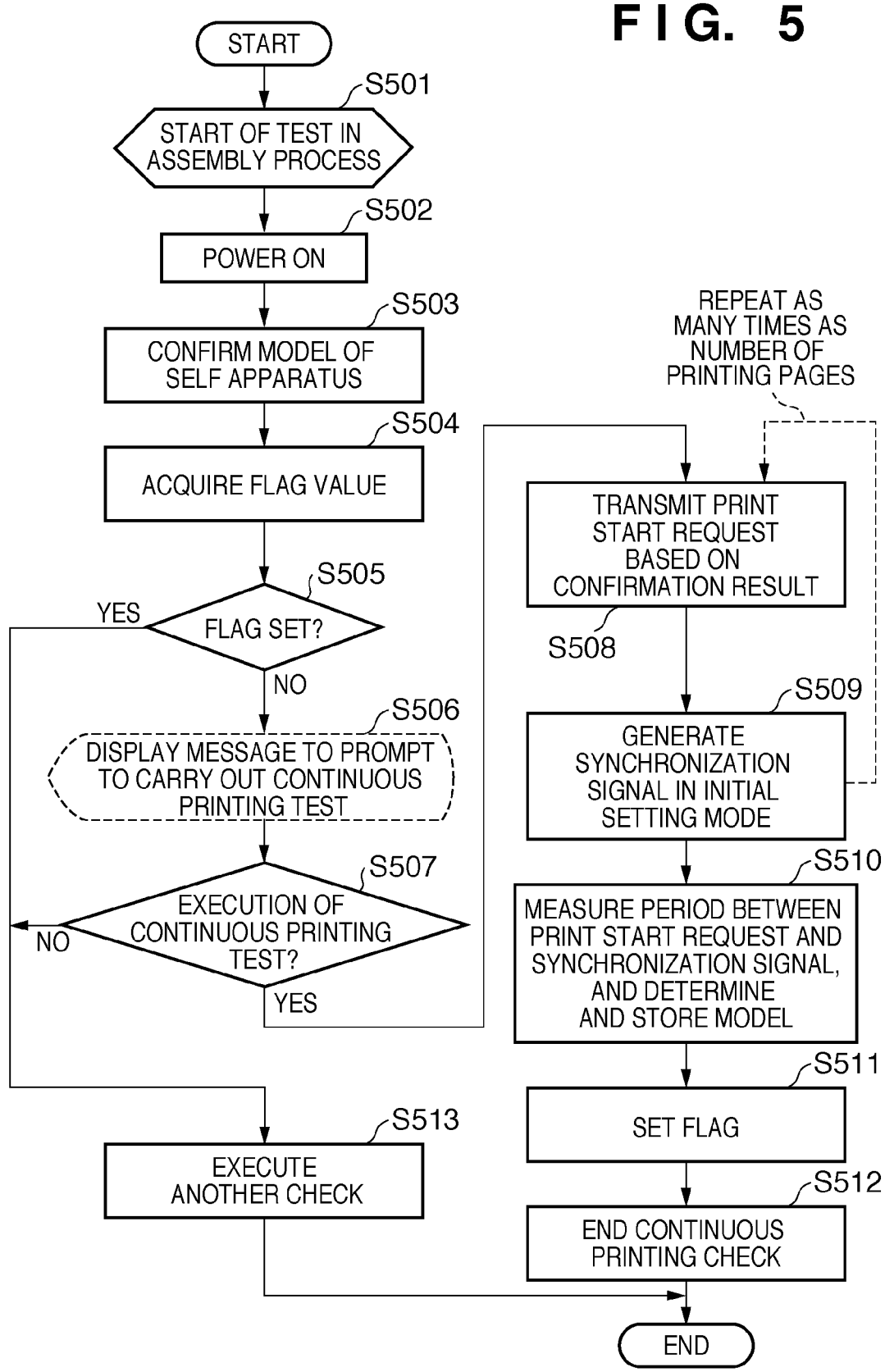
FIG. 5 is a flowchart illustrating a control procedure in the assembly process according to the embodiment.

Details of the control procedure of the operation shown in FIG. 3 will be described next with reference to FIG. 5. Note that the processing of the system control unit 1000 to be explained below is comprehensively controlled by the CPU 12, and the processing of the engine control unit 2000 is comprehensively controlled by the CPU 202.

In step S501, validation of the assembly process is executed. In step S502, the printer 1500 is powered on. In step S503, the system control unit 1000 confirms the preset model of the self apparatus.

In step S504, the engine control unit 2000 acquires the value of the self-determined flag. In step S505, the engine control unit 2000 determines whether the acquired self-determined flag has been set. If the flag has been set, the process advances to step S513. If the flag has not been set, the process advances to step S506. The set self-determined flag indicates that the model has already been specified.

In step S506, the engine control unit 2000 displays, on the operation unit 1501, a message to prompt to carry out the continuous printing test. Note that this message need not always be displayed at this timing because the continuous printing test need only be made during the assembly process. When the operation unit 1501 has displayed the message to prompt to carry out the continuous printing test, the engine control unit 2000 determines in step S507 whether execution of the continuous printing test is requested. If the execution is requested, the process advances to step S508. If the execution is not requested, the process advances to step S513.

In step S508, the system control unit 1000 functions as a start request output unit to transmit a print start request to the engine control unit 2000 based on the self model confirmation result. In step S509, the engine control unit 2000 functions as a synchronization signal output unit to, upon receiving the print start request, generate a synchronization signal as a model initially set in advance and output the signal to the system control unit 1000. Upon receiving the synchronization signal, the system control unit 1000 functions as a data output unit to output image data as an image formation target to the engine control unit 2000.

After that, the processes in steps S508 and S509 are repeated as many times as the number of continuous printing pages. In step S510, the engine control unit 2000 functions as a measuring unit to measure the timing between the print start request and the synchronization signal during the repetitive processes in steps S508 and S509. The engine control unit 2000 also functions as a model specifying unit to specify the model based on the measurement result and store information representing the self model in a memory. Then, in steps S511 and S512, the engine control unit 2000 sets the self-determined flag and ends the continuous printing test.

On the other hand, in step S513, the engine control unit 2000 confirms whether another validation test is requested. Without any other request, the processing ends. If another request exists, the test is executed, and the processing ends. Even if execution of the continuous printing test has not been requested in step S507, any test other than the continuous printing test can be executed in step S513.

Note that when specifying the model in step S510, the engine control unit 2000 may use a table which is stored in the ROM 203 or the like and associates measured periods with models. In this case, the engine control unit 2000 measures the period and searches the table for a model based on the measured period, thereby specifying the model.

Processing of causing the engine control unit 2000 to specify the model in step S510 will be described next in detail with reference to FIG. 7.

Reference numeral 701 indicates a timing of the print start request output from the system control unit 1000 to the engine control unit 2000 in the continuous printing mode. The system control unit 1000 confirms whether the printing unit 17 can receive a printing reservation of the next page. If reception is possible, the system control unit 1000 transmits the print start request for the next page at the timing based on the model confirmation result.

Reference numeral 702 indicates a timing of a sub scanning synchronization signal output from the engine control unit 2000 that has received the print start request to the system control unit 1000. The sub scanning synchronization signal is output in accordance with the state of the printing unit 17. As for a sub scanning synchronization signal generation timing 706, the sub scanning synchronization signal is generated at the timing of initial setting when the self-determined flag is not set. When the self-determined flag is set, the sub scanning synchronization signal is generated at a timing fixed for the model. These generation timings are stored in, for example, the memory of the printer 1500 in advance.

Reference numeral 703 indicates a timing of a main scanning synchronization signal output from the engine control unit 2000 to the system control unit 1000. In synchronism with the main scanning synchronization signal, the system control unit 1000 outputs video data to the engine control unit 2000 at a timing 704.

Figure 7:
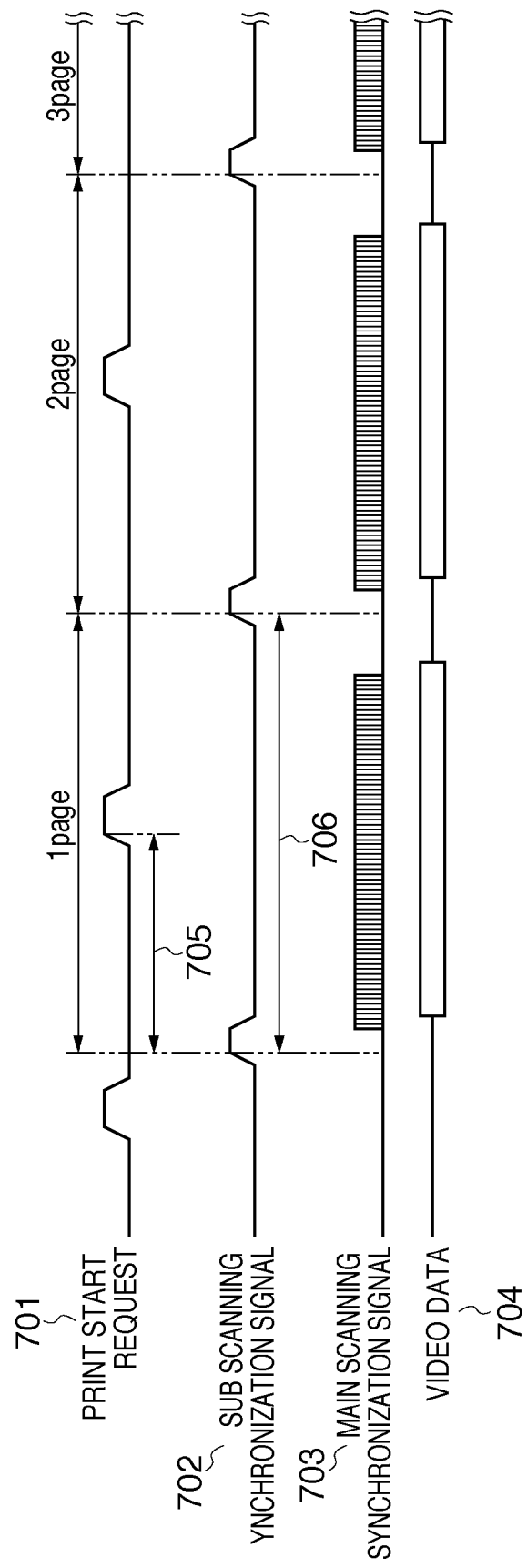
FIG. 7 is a timing chart showing the timing of each signal measured when specifying a model according to the embodiment.

When measuring the period between the synchronization signal and the print start request in step S510, the engine control unit 2000 measures a period 705 in FIG. 7. More specifically, the engine control unit 2000 measures the period from output of a sub scanning synchronization signal to output of the next print start request.

Figure 4:
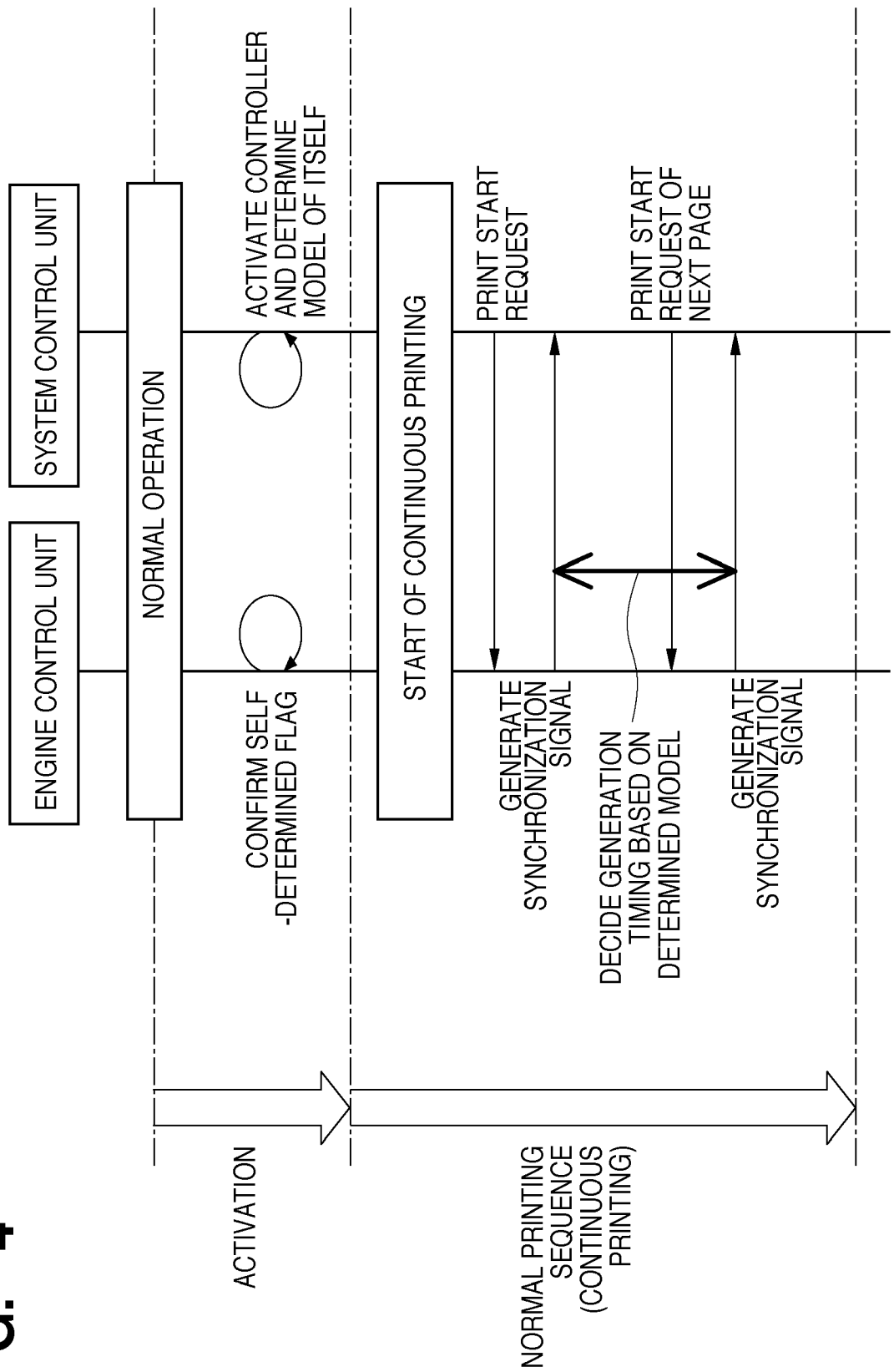
FIG. 4 is a sequence chart showing the operation sequence of continuous printing in a normal operation according to the embodiment.

The operation sequence of continuous printing in a normal operation after the self-determined flag has been set will be described next with reference to FIG. 4. Note that the operation sequence at the activation time in the normal operation is the same as that in the assembly process described with reference to FIG. 3, and a description thereof will not be repeated.

When continuous printing starts, the system control unit 1000 transmits a print start request to the engine control unit 2000. Upon receiving the print start request, the engine control unit 2000 outputs a synchronization signal and receives video data. These processes are repeated until data of all continuous printing pages are received. The processing procedure is the same as in the assembly process except the generation timing of the synchronization signal generated by the engine control unit 2000.

In the normal operation, the self-determined flag of the engine control unit 2000 is already set. Hence, the synchronization signal generation timing is decided based on the information of the model specified in the assembly process.

Figure 6:
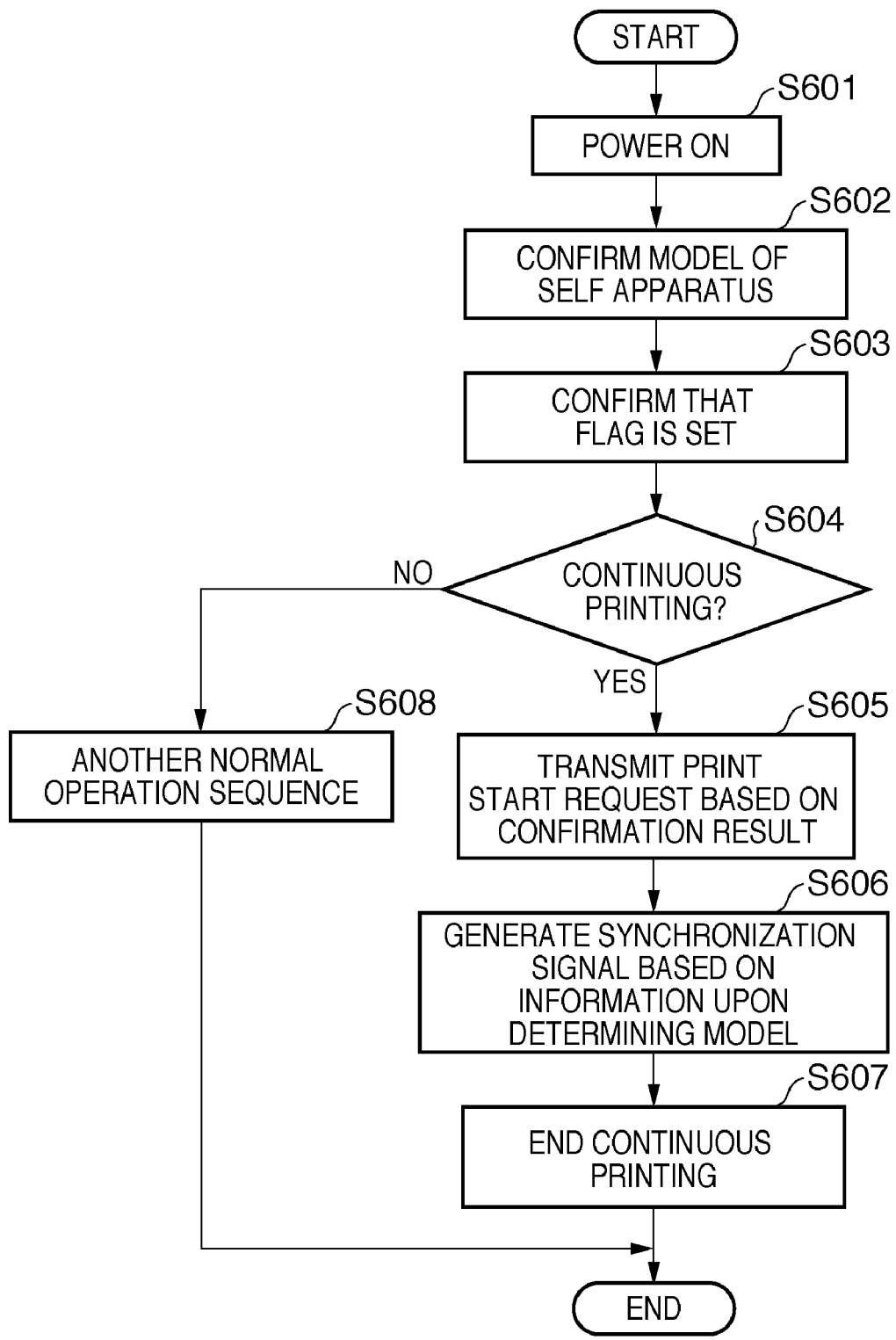
FIG. 6 is a flowchart illustrating a control procedure in the normal operation according to the embodiment.

Details of the control procedure of the operation shown in FIG. 4 will be described next with reference to FIG. 6. Note that the processing of the system control unit 1000 to be explained below is comprehensively controlled by the CPU 12, and the processing of the engine control unit 2000 is comprehensively controlled by the CPU 202.

In step S601, the printer is powered on. In step S602, the system control unit 1000 confirms the preset model of the self apparatus.

In step S603, the engine control unit 2000 acquires the value of the self-determined flag. In step S604, the printer 1500 determines whether a currently requested print job is continuous printing. If the job is continuous printing, the process advances to step S605. If the job is not continuous printing, the process advances to step S608.

In step S605, the system control unit 1000 transmits a print start request to the engine control unit 2000 based on the self model confirmation result. In step S606, upon receiving the print start request, the engine control unit 2000 generates a synchronization signal based on the generation timing decided by the information upon specifying the model, and outputs the signal to the system control unit 1000. The processes in steps S605 and S606 are repeated as many times as the number of continuous printing pages. When continuous printing has ended, the processing ends in step S607. If it is determined in step S604 that the job is not continuous printing, normal print processing is executed in step S608.

As described above, the image forming apparatus according to the embodiment executes a continuous image formation test to specify the model of the self apparatus when the system control unit is connected to the engine control unit in the assembly process. More specifically, the system control unit outputs a start request to start image formation to the engine control unit. Upon receiving the start request, the engine control unit generates a synchronization signal and outputs it to the system control unit. Upon receiving the synchronization signal, the system control unit outputs image data of the image formation target to the engine control unit. These processes are repeated as many times as the number of continuous image formation pages. When executing the continuous image formation test, the engine control unit measures the period from the synchronization signal output by it to reception of the next start request output by the system control unit. The engine control unit also specifies the model of the image forming apparatus in accordance with the measured period. This allows the image forming apparatus to specify the model of itself using the existing arrangement without separately adding any component (e.g., a mechanism for outputting/detecting pulses) to specify the self apparatus. Additionally, in the image forming apparatus, for example, the engine control unit need not hold information representing the model of the self apparatus. It is therefore possible to prevent any error resulting from a change in held information caused by some external factor. Hence, the image forming apparatus can accurately specify the model of itself without increasing cost.

Note that the present invention is not limited to the above-described embodiment, and various changes and modifications can be made. For example, the engine control unit may have a flag representing whether the model has been specified. In this case, the image forming apparatus need only execute continuous image formation to specify the model only when the model is not specified, and can suppress any decrease in productivity by the model specifying processing.

In the above-described embodiment, the model information is set in advance in the system control unit. However, the model information may be set in the engine control unit. In this case, the system control unit has a self-determined flag and executes predetermined processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-047017 filed on Feb. 27, 2009, which is hereby incorporated by reference herein in its entirety.

What is claimed is:

1. An image forming apparatus comprising a first control unit that controls the image forming apparatus, and a second control unit that controls image formation processing, said first control unit comprising:
a start request output unit that outputs a start request to start image formation to said second control unit; and
a data output unit that outputs image data for image formation to said second control unit in accordance with a synchronization signal output from said second control unit, and said second control unit comprising:
a synchronization signal output unit that generates the synchronization signal and outputs the synchronization signal to said first control unit in response to the start request from said first control unit;
an execution unit that executes image formation based on the image data output from said first control unit in accordance with the synchronization signal;
a measuring unit that measures a period from output of the synchronization signal to reception of a next start request output from said first control unit; and
a model specifying unit that specifies a model of the image forming apparatus in accordance with the period measured by said measuring unit.

2. The apparatus according to claim 1, wherein
said second control unit has a flag representing whether or not the model of the image forming apparatus has been specified, and
said measuring unit measures the period when the flag has a value representing that the model has not been specified.

3. The apparatus according to claim 2, wherein
when the value of the flag represents that the model has been specified, said synchronization signal output unit outputs the synchronization signal at a timing corresponding to the specified model, and
when the value of the flag represents that the model has not been specified, said synchronization signal output unit outputs the synchronization signal at a predetermined timing.

4. The apparatus according to claim 2, wherein when the model of the image forming apparatus has been specified, said model specifying unit sets, in the flag, the value representing that the model has been specified.

5. The apparatus according to claim 2, wherein the flag becomes settable after said first control unit and said second control unit are connected for the first time.

6. The apparatus according to claim 1, wherein
said second control unit further comprises a storage unit that stores, in advance, a table that associates the period with the model, and
said model specifying unit specifies the model using the table in accordance with the measured period.

7. The apparatus according to claim 1, wherein
said synchronization signal output unit outputs a main scanning synchronization signal and a sub scanning synchronization signal, and
said measuring unit measures a period between the sub scanning synchronization signal and the start request.

8. A method of controlling an image forming apparatus comprising a first control unit that controls the image forming apparatus, and a second control unit that controls image formation processing, comprising:
causing the first control unit to output a start request to start image formation to the second control unit;
causing the second control unit to generate a synchronization signal and output the synchronization signal to the first control unit in response to the start request from the first control unit;
causing the first control unit to output image data for image formation to the second control unit in accordance with the synchronization signal output from the second control unit;
causing the second control unit to execute image formation based on the image data output from the first control unit in accordance with the synchronization signal;
causing the second control unit to measure a period from output of the synchronization signal to reception of a next start request output from the first control unit; and
causing the second control unit to specify a model of the image forming apparatus in accordance with the period measured in the step of causing the second control unit to measure.

* * * * *